April 21, 1959     R. L. KETTER     2,882,722
MOMENT MEASURING DEVICE
Filed Sept. 7, 1955     3 Sheets-Sheet 1
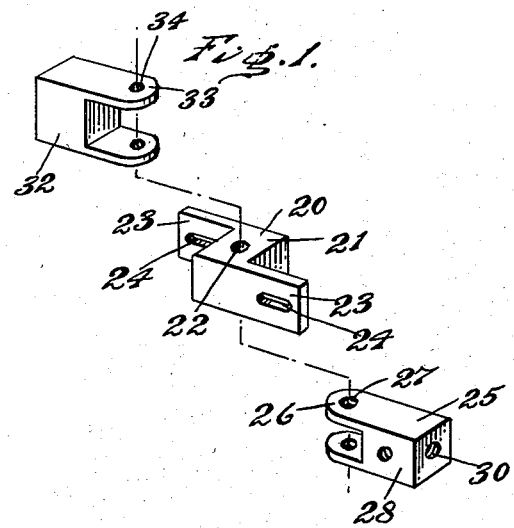
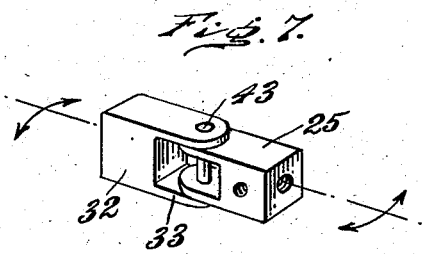
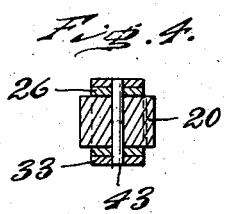
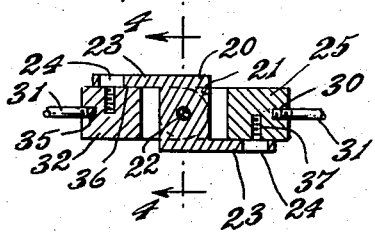
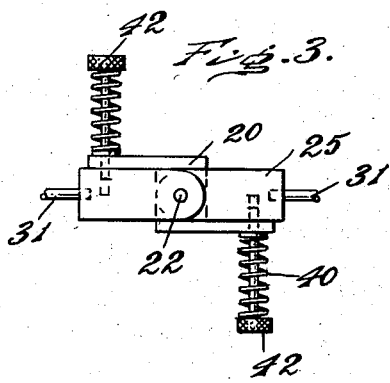
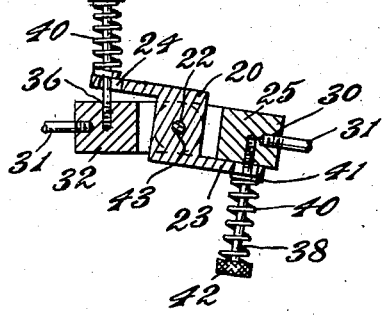
INVENTOR
Robert Lewis Ketter
BY
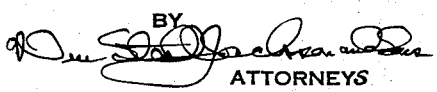
ATTORNEYS April 21, 1959 R. L. KETTER 2,882,722
MOMENT MEASURING DEVICE
Filed Sept. 7, 1955 3 Sheets-Sheet 2

INVENTOR
Robert Lewis Ketter
BY
ATTORNEYS.

April 21, 1959 R. L. KETTER 2,882,722
MOMENT MEASURING DEVICE
Filed Sept. 7, 1955 3 Sheets-Sheet 3

INVENTOR
Robert Lewis Ketter
BY
ATTORNEYS

United States Patent Office 2,882,722
Patented Apr. 21, 1959

2,882,722

MOMENT MEASURING DEVICE

Robert Lewis Ketter, Bethlehem, Pa., assignor to Lehigh University, Bethlehem, Pa., a corporation of Pennsylvania Application September 7, 1955, Serial No. 532,964

7 Claims. (Cl. 73—133)

The present invention relates to testing, and particularly to the character of testing for plastic design in which a model is made up and subjected to load to determine the yielding under load.

A purpose of the invention is to introduce prestressed hinges at selected points in a model structure, calibrate the prestress in the hinges, subject the structure to load and then measure the yielding by the deflection and the known calibration.

A further purpose is to employ testing hinges which include a moment base, hinge elements pivoted on the base and preferably coaxial, stops on the base limiting motion of the hinge elements in different directions, and spring means biasing the hinge elements against deflection.

A further purpose is to provide a helical compression spring for biasing the hinge elements.

A further purpose is to utilize a Euler column or leaf spring to bias the hinge elements.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is an exploded perspective of the preferred embodiment, omitting the spring means.

Figure 2 is a longitudinal section of the device of Figure 1 in contracted form, the section being taken transverse to the pivot axis and omitting the spring means.

Figure 3 is a plan view of the testing hinge of the invention as shown in Figure 1 and including the spring means.

Figure 4 is a section through the pivot on the line 4—4 of Figure 2.

Figure 5 is a view corresponding to Figure 2 showing the hinge deflected in one direction.

Figure 6 is a view corresponding to Figure 2 showing the hinge deflected in the opposite direction.

Figure 7 is a perspective of the hinge elements pivoted without the moment base.

Figure 8 is a plan view of a modified embodiment showing Euler columns as springs.

Figure 9 is a sectional perspective of the modification of Figure 8.

Figure 10 is a plan view of the device of Figures 8 and 9 showing one hinge deflected.

Figure 11:
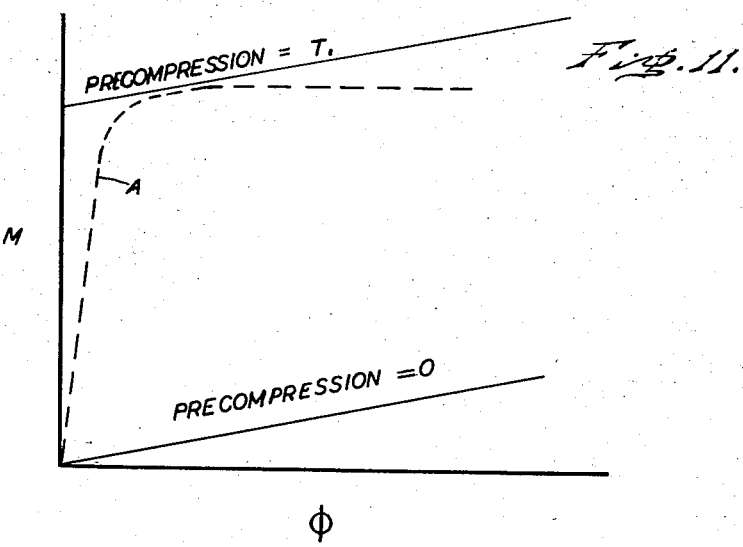
Figure 11 is a curve useful in explaining the invention.

Describing in illustration but not in limitation and referring to the drawings:

It has been common practice in the past to study the behavior of structures under load by building models and subjecting them to load application. In some instances the structures have been tested to failure, in other instances deflections are measured by strain gauges, and in other cases photoelastic studies are made. Stress indicating coatings are sometimes used.

The present invention is concerned with testing of structures to observe behavior under stress, using models, but employing hinges to permit measurable deflection. The invention may be applied to aid the designer in the development of structures, or as a tool in research, or as a device to assist in education in such subjects as civil engineering, mechanics or the like, or as an educational toy to permit studiously inclined children to work out principles of engineering.

The invention is believed to find its widest application in ultimate strength analysis of structures, commonly called plastic design, and the invention will be explained using plastic design as an example. In plastic design it is necessary either from knowledge of previous failures or from solutions of all the possible types of failure, to determine the mode in which the structure is likely to fail under a particular type of loading. This information can be developed by introducing a sufficient number and a proper arrangement of theoretical plastic hinges so that the structure is deformed at the hinges when external load is applied. For a simple structure having only a few redundants it is easy to calculate the proper positions for the hinges. As redundancy increases complexity of analysis increases and it is very difficult to analyze the structure.

The present invention was developed to simulate in a mechanical device the moment-curvature behavior of a particular structural member and provide for the insertion of such mechanical devices at all possible locations where plastic hinges might theoretically be present in a model. Then by loading the model the correct hinge locations can be determined without extensive calculations.

Furthermore, from a model including such mechanical hinge devices, where the plastic hinges are calibrated to determine the relation of deflection to load, it is possible by simply reading the deflections to quantitatively analyze the structure for design purposes.

It is not only very difficult to analyze the structure from a standpoint of location of the hinges, but it is often difficult to predict in which direction a hinge will rotate. Furthermore, the stiffness of different hinges must be different.

I have provided a hinge structure which meets these requirements.

Considering first the form of Figures 1 to 6, I illustrate a moment base 20 which is preferably of Z formation and has a body 21 provided with a pivot opening 22 and stop extensions 23 extending in opposite directions from opposite sides of the body. The stop extensions have central slots 24 near their outer ends.

A hinge element 25 has yoke ends 26 which straddle the body of the moment base and are provided with pivot openings 27 which line up with the pivot opening 22. When in straight position the rear side surface 28 of the hinge element 25 engages the stop extension 23 which limits movement. The hinge element has at the end opposite from the yoke a central threaded opening 30 which receives a threaded rod 31 which extends to the next testing hinge of the structure.

On the opposite side of the moment base an opposite hinge element 32 has a yoke 33 sufficiently wide to straddle not only the moment base but also the yoke of the hinge element 25, and the yoke 33 has pivot openings 34 which line up with the pivot openings 27 in the hinge element 25 and the pivot opening 22 in the moment base.

The hinge element 32 at the end opposite to the yoke has a threaded opening 35 which receives another threaded rod 31 which connects with the next testing hinge in the structure. When the hinge element 32 is in position and in straight alignment it engages the stop extension 23 along its side 36. Each of the hinge elements in line with the slot 24 has a threaded hole 37 which receives a stud or screw 38 anchored in the hinge element. The stud or screw passes through the slot 24 and beyond the stop extension is surrounded by a helical compression spring 40 which acts between a washer 41 engaging the stop extension and a nut or head 42 at the outer end.

A pivot pin 43 extends through the hinge elements and the moment base to hold the elements together and pivot the same.

In the simplified case under discussion, it has been considered sufficient to show a single axis permitting yielding of the hinge against the preload of the spring in one direction as shown in Figure 5 or in the opposite direction as shown in Figure 6. It will be evident of course that if it is required to have yielding in a three component system, this can be accomplished by placing hinges close together with their axes at right angles or incorporating universal pivoting in a particular hinge with prestressing in the X—Y plane and also in the Z plane.

In some cases it may be desirable to have a hinge which does not embody any prestress and the hinge of the invention can be used for this purpose by combining the hinge elements 25 and 32 as shown in Figure 7, omitting entirely the moment base and the spring means.

It will be evident that for calibration purposes as later explained the prestress can be built up by screwing down on the nuts 42, or by employing springs 40 of different stiffnesses on different hinges or different sides of an individual hinge.

In some cases it is desirable to use a simpler spring than the helical compression spring and I illustrate in Figures 8, 9 and 10 a variation. In this case the moment base 20' has stop abutments 23' at opposite corners. The hinge element 25' has a yoke pivoting on the central pin 43 and the hinge element 32' has a similar yoke pivoting on the pin 43, the structure being in this respect identical with that of Figures 1 to 6 except that the yokes are made by attaching separate pieces 44 by screws 45.

From the side toward which hinge element 25' is free to move, a spring abutment 46 protrudes from the moment base and from the side toward which hinge element 32' is free to move spring abutment 47 protrudes from the moment base. Each of the hinge elements has a spring abutment 48 opposed to the corresponding spring abutment on the moment base. Each of the spring abutments has a notch 50 opposite the opposite spring abutment and the notches receive a predeflected Euler column or leaf spring 51. The structure deflected in one direction is shown in Figure 10.

The actual behavior of the testing hinge in bending will be best understood by considering Figure 11 which plots the moment M as ordinate against the curvature angle phi. If the precompression of the spring were zero as shown near the bottom before moment application, the moment-curvature line would be as shown by the lower line marked "precompression=zero." If a precompression of $T_1$ were present prior to the initiation of external load, the behavior would be that of the upper line marked "precompression=$T_1$." The curve marked A shows the behavoir of a typical wide flange member. The fact that the hinge does not identically reproduce the behavior of the wide flange member is not serious since the analysis previously used assumes an even greater deviation.

Figure 11A:
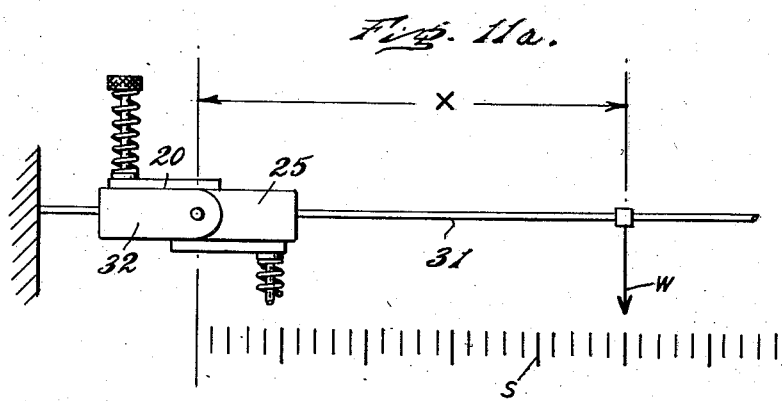
Figure 11a is a calibration diagram.

The relative stiffness between hinges is the only relationship needed, and each hinge can be set at a relative moment by using the calibration set up of Figure 11a. A load W is placed at a distance X from the pivot of the hinge of Figures 1 to 6 or 8 to 10, the distance being measured on a scale S. The distance X is chosen proportionally to the stiffness of the prototype member. The spring is then suitably adjusted as by tightening the nut 42 or replacing springs of predetermined stiffness until the load will just cause deflection. The critical moment can thus be determined.

Figure 12:
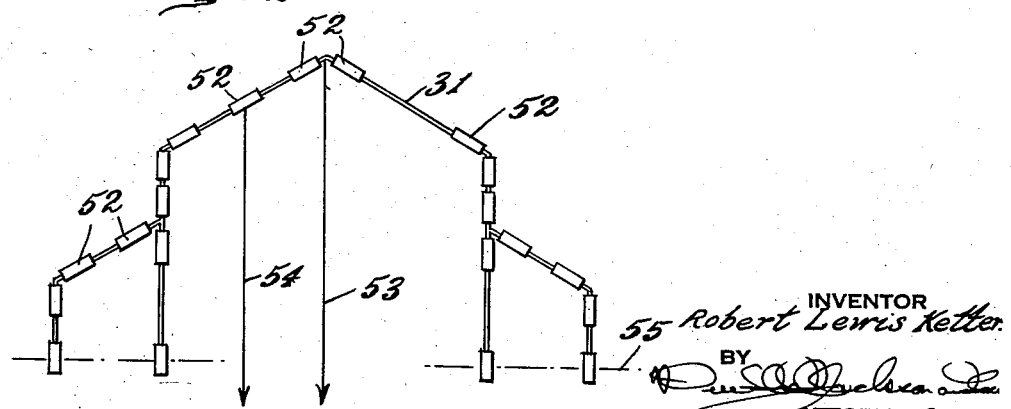
Figure 12 is a stress model showing the utility of the testing hinges of the invention.

A typical model test set up is shown in Figure 12 including numerous test hinges 52 according to the invention distributed as dictated by the knowledge of the tester, and connected by suitable rods 31. Loads are applied as by applying weights at 53 and 54. It is desirable to have the structure under test horizontal and if so the weights can be applied over pulleys acting on cables. In this case also, antifriction means are desirably placed under the hinges. The structure is supported as indicated by the base line 55.

By using the method and the apparatus of the invention, approximately 60 to 70 percent of the analysis time on a complicated structure can be saved.

By determining the relationship of similitude between the model and the prototype actually ultimate loads can be determined from the model.

A model can be utilized to reduce weight in design by utilizing as much as possible of the structure to reach ultimate bending strength. Preliminary designs can be tested on models by changing the effective stiffness of the various hinges to obtain the desired character of failure. The determination of the critical moment values for the resulting hinges will give the relative size of the members required in the structure. There has been no prior art procedure which would permit determining this.

It is also possible by the invention to introduce more flexible rods and thus determine deflection under loads near the ultimate load.

The invention is a valuable research aid in assisting the researcher to better understand the behavior of redundant structures.

The invention is believed to have great utility in evaluating locations and methods of attachment as for example in welded structures.

In view of my invention and disclosures, variations and modifications to meet individual whim or particular need will doubtless become evident to others skilled in the art, to obtain all or part of the benefits of my invention without copying the method and structure shown, and I, therefore, claim all such insofar as they fall within the reasonable spirit and scope of my claims.

Having thus described my invention, what I claim as new and desire to secure by Letters Patent is:

1. In a test equipment for indicating stress distribution, a moment base, a first hinge pivoted on the moment base, a second hinge pivoted on the moment base on an axis parallel to that of the first hinge, a first stop on the moment base engaged by the first hinge and limiting motion in one direction of motion of the first hinge, a second stop on the moment base engaged by the second hinge and limiting motion in an opposite direction of motion of the second hinge, first spring means calibrated in terms of stress biasing the first hinge toward the first stop, and second spring means calibrated in terms of stress, independent of the first spring means, and biasing the second hinge toward the second stop.

2. An equipment of claim 1, in which the first and second hinges are coaxial.

3. An equipment of claim 1, in which each spring means includes a helical compression spring.

4. An equipment of claim 1, in which each spring means comprises a Euler column.

5. An equipment of claim 1, in which the moment base is of Z shape and the stops extend in opposite directions from the center of the Z.

6. An equipment of claim 5, in which there are openings in the outer ends of the Z, and in which the spring means comprises a stud mounted on each hinge extending through one of the openings in the Z, a helical compression spring surrounding the stud beyond the stop formed by the extension of the moment base, and an adjustable spring abutment at the outer end of the stud.

7. An equipment of claim 1, in which the moment base has spring abutments extending from the opposite sides, each hinge has a spring abutment cooperating with the opposed spring abutment on the adjoining side of the moment base, and the spring means comprises leaf springs engaged between the spring abutments on the opposite sides.

References Cited in the file of this patent

UNITED STATES PATENTS

| | | |
|---|---|---|
| 839,589 | Hochstrasser | Dec. 25, 1906 |
| 941,672 | Canfield | Nov. 30, 1909 |
| 2,167,872 | Bristol | Aug. 1, 1939 |
| 2,668,444 | Berman | Feb. 9, 1954 |